United States Patent
Lana

[15] 3,654,832
[45] Apr. 11, 1972

[54] NAIL SCREW FASTENING SYSTEM
[72] Inventor: Garnet L. Lana, 20133 Delita Drive, Woodland Hills, Calif. 91364
[22] Filed: Oct. 21, 1968
[21] Appl. No.: 769,294

[52] U.S. Cl. ..........................85/45, 85/48, 145/50 DA
[51] Int. Cl. .............................F16b 23/00, F16b 25/00
[58] Field of Search..................85/45, 44, 28, 22, 20, 41, 85/9, 61, 48, 10 R; 145/50 DA, 50 D, 50 R; 287/20.92 F

[56] References Cited

UNITED STATES PATENTS

| | | | |
|---|---|---|---|
| 963,330 | 7/1910 | Simon | 85/10 R |
| 178,000 | 5/1876 | Göbbels | 85/44 |
| 186,904 | 1/1877 | Vanstone et al. | 85/44 X |
| 1,188,305 | 6/1916 | Noerteman | 85/41 |
| 1,816,162 | 7/1931 | Tolman | 85/20 X |
| 2,248,695 | 7/1941 | Bradshaw | 85/45 |
| 2,509,980 | 5/1950 | McCallum | 85/45 UX |
| 2,532,296 | 12/1950 | Giesen | 85/41 X |

FOREIGN PATENTS OR APPLICATIONS

| | | | |
|---|---|---|---|
| 1,193,927 | 5/1959 | France | 85/45 |

Primary Examiner—Ramon S. Britts
Attorney—Spensley, Horn and Lubitz

[57] ABSTRACT

A nail screw fastening system comprising a novel nail screw together with a tool head for driving it, the nail screw being easily fabricable by rolling or stamping threads on the pointed end of stamped nail stock so that the thread ridges project radially outward beyond the nail shank, and by cutting V-shaped peripheral notches in the nail head to form flanges. The driving tool head is a cylindrical body adapted at one end for coupling to a source of rotary motion and its other end having an axial passageway of uniform cross section complementary to the cross section of the screw nail head flange and terminating in a permanent magnet end wall.

3 Claims, 11 Drawing Figures

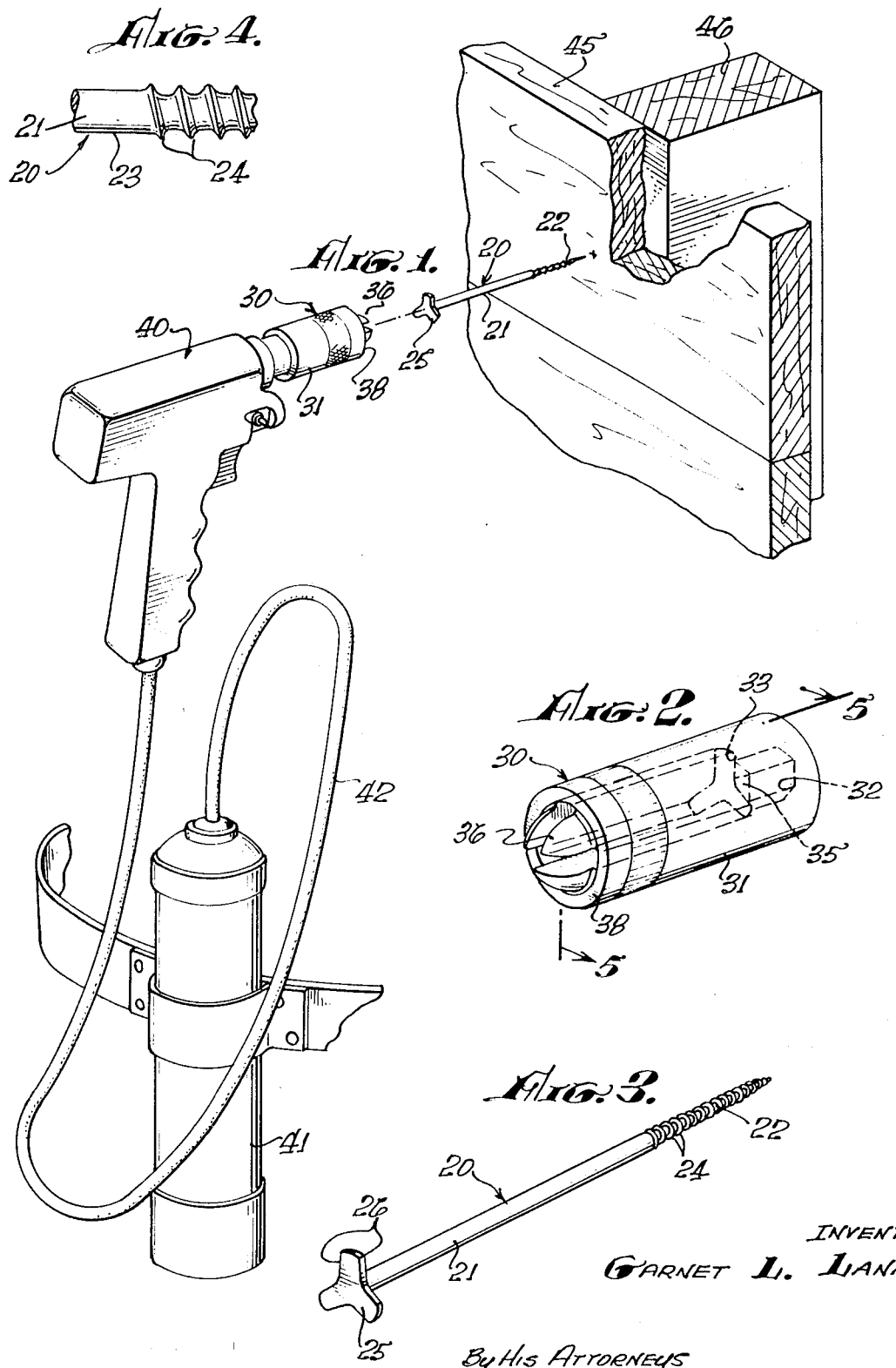

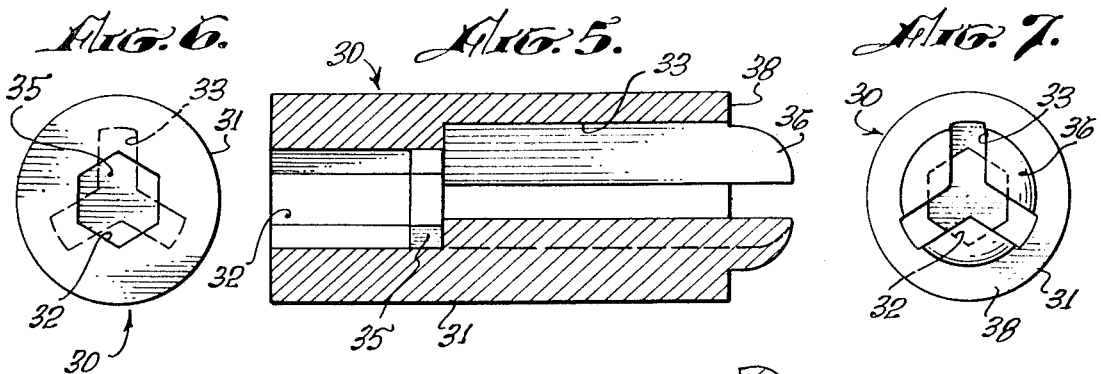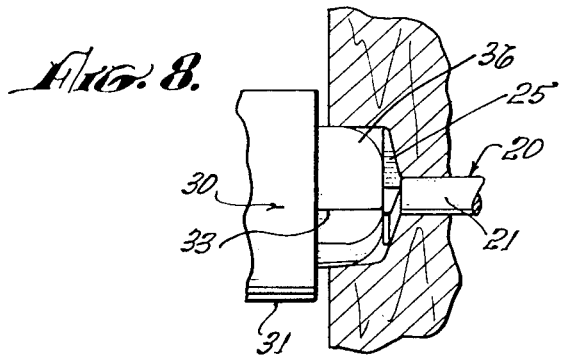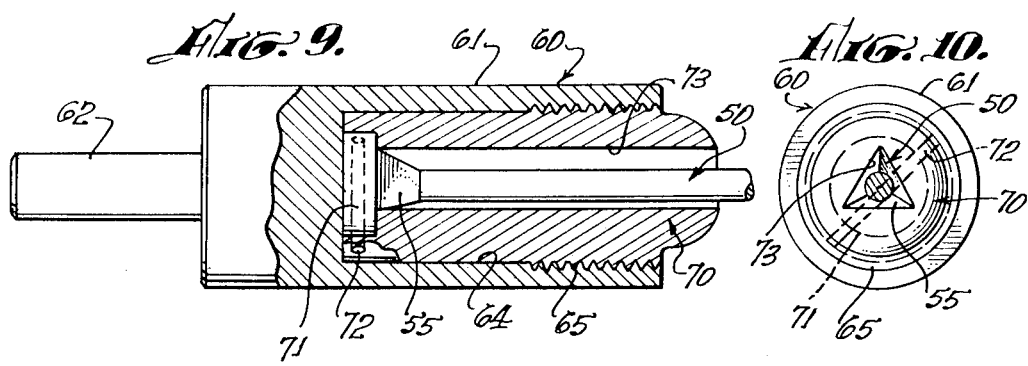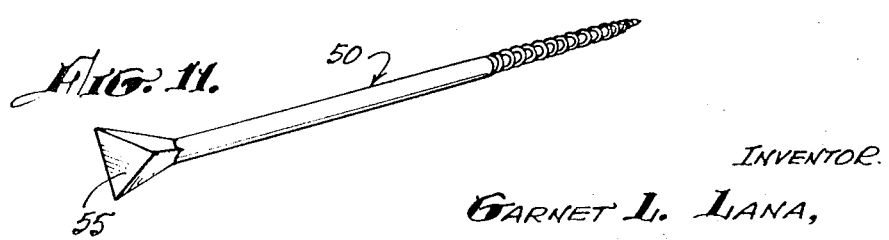

3,654,832

NAIL SCREW FASTENING SYSTEM

BACKGROUND OF THE INVENTION

It is well known that the holding power of a wood screw is generally significantly greater than that of a nail of the same length. However, wood screws require much more time and effort to install than nails and also are more expensive. Efforts to provide a fastener combining the best attributes of both screws and nails have resulted in the development of a so-called "screw nail", which is a nail in whose surface shallow helical depressions are formed, so that as it is driven in place with blows from a hammer it turns like a screw. Although screw nails have somewhat more holding power than ordinary nails their holding power is still much less than that of screws and they also possess the disadvantageous characteristic of nails (and of screws when driven without pre-drilling) of the tendency to split the wood into which it is driven. So even after development of the screw nail there still has existed a need for an inexpensive fastener which has the holding power of a screw, which requires much less time and effort to install than a screw or screw nail and which doesn't have a tendency to cause splitting. The present invention is directed toward a fulfillment of this need by providing a novel fastener and tool head for driving it.

SUMMARY OF THE INVENTION

The present invention fastener can be appropriately termed a "nail screw" since it is driven by rotation rather than by pounding with a hammer and is, by stamping stock and rolling or stamping threads, as inexpensively fabricable as an ordinary box nail. The present invention nail screw generally comprises an elongated cylindrical body having a pointed tip at one end and a circumferentially projected head at the other end, the body being longitudinally threaded from its pointed tip throughout a portion of its total length, the head defining a plurality of radially outward extending flanges for receptive engagement with the head of a driving tool. One of the important features of the present invention nail screw is that the minor diameter of the threads is substantially equal to the diameter of the remaining unthreaded portion of the cylindrical body, whereby the threaded ridges project radially outward beyond the circumference of the remaining unthreaded body portion. This is in contrast to the ordinary screw having cut threads, whereby the minor thread diameter is less than the diameter of the unthreaded screw body portion and the thread ridges do not define the maximum diameter of the screw body. This present invention feature is important since it obviates the tendency for splitting since the unthreaded shank portion does not cause undue stressing of the wood as the nail screw is driven. Actually, the natural resiliency of the wood fibers results in the fibers contracting to close down onto the unthreaded shank portion behind the threads, thereby providing the desired strong holding power.

Another important characteristic of the present invention nail screw fastener is its flanged head, designed for quick and easy engagement with the head of the driving tool. It is presently preferred to utilize three equally circumferentially spaced transversely extending flanges, each flange having substantially parallel radially extending side surfaces; although the number of such flanges may be more or less than three.

The present invention driving tool head, in its preferred embodiment, is designed for plugging into a hand-held rotator device, typically pneumatically or electrically driven. The tool head is basically a cylindrical body adapted at one end for coupling to the rotator device and defining an axial passageway extending from its other end with a permanent magnet providing an end wall for the interior passage termination. The cross section of the passageway is substantially identical to but slightly greater than the head flange cross section of the nail screw to accommodate insertion of the head end of the nail screw to a driving position wherein the nail screw head is abutting against the permanent magnet forming the end wall of the passageway. Thus, a nail screw of a magnetic material is held in the driving position by magnetic force.

An additional feature of the preferred embodiment of the present invention tool head is that the nail screw receiving end of the body is provided with a reduced diameter tip portion shaped to form a countersink, a transverse annular shoulder limiting the countersink depth and providing for automatic withdrawal of the nail screw from the tool head at the completion of the driving operation.

The novel features which are believed to be characteristic of the invention, both as to its organization and method of operation, together with further objects and advantages thereof will be better understood from the following description considered in connection with the accompanying drawings which illustrate the present invention system and components by way of example.

BRIEF DESCRIPTION OF THE DRAWINGS

FIG. 1 is a pictorial drawing indicating the present invention apparatus in use;

FIG. 2 is a perspective view of the driving tool head used in the apparatus of FIG. 1;

FIG. 3 is a perspective view of the nail screw used in FIG. 1;

FIG. 4 is a partial elevation view of the nail screw of FIG. 3;

FIG. 5 is a cross sectional view taken along the line 5—5 of FIG. 2;

FIGS. 6 and 7 are opposing end views of the tool head of FIG. 2;

FIG. 8 is a partial elevation view illustrating the countersinking operation of the tool head tip;

FIG. 9 is an elevation view, partially cut away of another embodiment of the present invention tool head;

FIG. 10 is an end view of the tool head of FIG. 9; and

FIG. 11 is a perspective view showing another embodiment of the present invention nail screw.

DESCRIPTION OF THE PREFERRED EMBODIMENTS

Turning first to FIG. 3 of the drawing the presently preferred embodiment of the present invention nail screw is generally indicated by the reference numeral 20. The nail screw 20 is a unitary structure comprising an elongate cylindrical body 21 having a pointed tip 22 at one end and a circumferentially projecting head 25 at the other end. The screw body 21 is longitudinally threaded from the pointed tip 22 for about one-fourth to one-third of the total body length. It has been found that near-maximum gripping power and proper driving is obtainable when the threads extend for only about one-fourth of the body length. On the other hand, a threading length appreciably in excess of about one-third of the total body length could interfere with proper driving of the nail screw and its positioning in the head of the driving tool.

An important feature of the present invention nail screw is that the threaded ridges project radially outward beyond the circumference of the unthreaded portion of the nail screw body. This feature is clearly shown in FIG. 4, the thread ridges 24 being of a greater diameter than that of the remaining unthreaded portion 23 of the nail screw body 21. The nail screw 20 can be easily and conveniently fabricated by stamping on the stock, with the desired thread configuration being formed on the stock by rolling or an additional stamping operation. V-shaped notches may be cut or stamped to form the desired flanged head 25. The nail screw 20 could be fabricated from an ordinary box nail merely by rolling or stamping threads on its pointed end and notching its head. It is presently perferred that the head 25 have three flanges in large nail screw configurations, it having been found that when a greater number of flanges are utilized the flanges tend to shear off during driving of the screw nail. In the screw nail embodiment shown in FIG. 3 the radially extending side surfaces of each flange are parallel.

The presently preferred embodiment of a tool head for driving the nail screw 20 is shown in FIGS. 2, 5, 6 and 7 the tool head being generally indicated by the reference numeral 30. The tool head 30 is fabricated from a metallic cylinder 31 and during operation rotates about its main axis. The tool head is relatively compact and designed to replace or supplement the chuck of a pneumatically or electrically operated hand-held power tool. The presently preferred embodiment is shown for use with power tools having a male coupling of hexagonal cross section. Accordingly, one end of the cylinder 31 is provided with an axially extending passageway 32 of hexagonal cross section. A permanent magnet 35 of identical hexagonal cross section is force fit into the passageway 32 and pushed to the very end of the passageway.

The other end of the metallic cylinder 31 is provided with an axial passageway 33 extending into communication with the passageway 32, whereby the permanent magnet 35 forms an end wall for the passageway 33. The cross section of the passageway 33 is substantially identical to, but slightly greater than, the cross section of the flanged head 25 of the nail screw 20 to allow the nail screw to be inserted, head end first, into the passageway 33 and pushed therein to a driving position wherein the nail screw head is abutting against the permanent magnet 35. Thus, the nail screw 20 can be quickly and easily loaded into the tool head 30 merely by axially pushing it into the passageway 33, the nail screw 20 being retained in the driving position by magnetic force.

The end of the cylindrical body 31 which contains the passageway 33 defines a tipped portion 36 formed to provide a countersink, the edge surfaces defined by the junction of the passageway 33 side walls with the exterior curved surfaces being somewhat sharpened. The maximum diameter of the tipped portion 36 is smaller than the outer diameter of the cylinder 31, thereby forming a transverse annular shoulder 38 for determining the countersink depth and providing automatic withdrawal of the nail screw 20 from the tool head 30, as will be explained with reference to FIGS. 1 and 8. It may be seen that the depth of desired countersink and the form of the countersink indentation may be varied in accordance with a preselected definition of the tipped portion 36.

To prepare for operation the tool head 30 is coupled to a hand-held power tool 40 by insertion of the male power tool coupling into the passageway 32. In the illustrated embodiment the power tool 40 is of the pneumatic type operated from a pressure tank 41 and coupled thereto by an air hose 42. A tool head 30 is selected in accordance with the size of the nail screw 20 to be driven, it being contemplated that a set of tool heads 30 be available to accommodate various nail screw sizes.

A nail screw 20 is loaded into the tool head merely by bringing the flanges of the nail screw head 25 into register with the passageway 33 and axially inserting the nail screw, head end first, into the passageway until the head 25 abuts against permanent magnet 35 forming the end wall of the passageway. This loading operation is very quick and simple, the nail screw being retained in a driving position in the tool head by magnetic force, the length of the passageway 33 being sufficient to maintain the nail screw in substantially coaxial alignment with the cylindrical axis of the tool head. Since the nail screw is threaded throughout only a minor portion of its length, the threads are somewhat spaced from the end of the tool head with the nail screw mounted in its driving position and hence do not interfere with loading or alignment.

The loaded power tool 40 is then used somewhat in the manner of a power drill, the pointed tip of the nail screw 20 being pushed against the surface of the pieces to be joined, such as the illustrated wood pieces 45 and 46. Axial pressure is used to start the nail screw, but once the threads are engaged in the wood, then further axial pressure is unnecessary since the screw action of the device tends to pull the nail screw into the wood, the threaded nail screw point acting somewhat like a drill because of its thread configuration. Of course, the power tool must be continually moved forward as the screw nail progresses into the wood in order to prevent the nail screw from being prematurely withdrawn from the tool head. Upon nearing completion of the driving operation the countersink tip 36 of the tool head is urged into contact with the surface of the wood piece 45, further pressure thereby causing a countersinking operation as indicated in FIG. 8. Upon contact of the transverse shoulder 38 with the wood surface, axial motion of the power tool is halted and further rotation of the tool head and nail screw 20 causes automatic withdrawal of the nail screw from the tool head as the nail screw penetrates deeper into the wood. Finally, with the tool head flange 38 being lightly held against the wood surface, the nail screw will be completely driven, the head 25 then clearing the countersink tip portion 36 of the tool head. Thus, it is seen that in one operation there is performed the functions of drilling, seating and countersinking. Furthermore, this operation takes no more time than pounding a nail and actually requires less labor, the movement being similar to that of drilling a hole with a power drill.

In FIG. 11 of the drawing there is shown an alternative embodiment of the present invention nail screw, generally indicated by the reference numeral 50 and differing from the FIG. 3 embodiment primarily in the shape of its head 55. The head 55 is in the general form of a triangular pyramid with its largest cross section defining one end surface of the nail screw. Therefore, the axial passageway in the tool head for driving this nail screw must be of triangular cross section complementary to the end of the nail screw.

In FIGS. 9 and 10 of the drawing there are shown various views of an alternative tool head 60 adapted for driving the nail screw 50. The tool head 60 is illustrated for use with a power tool having a female output coupling, the tool head having a cylindrical body 61 with a reduced diameter coaxial cylindrical projection 62 forming the male coupling. The projection 62 may also be threaded, notched, or be of a different cross section in accordance with the requirements of the particular power tool with which it is to be used. It is apparent that the present invention tool heads may be provided with any type of power tool coupling, either male or female. The other end of the cylinder 61 defines an elongate coaxial passageway 64 partially threaded as shown at 65. Threaded into this passageway is a tubular insert 70 of non-magnetic material having a disc-shaped permanent magnet secured at one end, the magnet 71 being non-rotatably secured into position by means of a stop pin 72. The exterior surface of the insert 70 is sized to fit the passageway of cylinder 61 and also provided with threads for engagement with the threads 65 of the tool head. Thus, the insert 70 is detachably secured in the cylinder 61 for easy removal or replacement. The interior surface of the tubular insert 70 defines an axial passageway 73 extending to the surface of the magnet 71, the cross section of the passageway 73 being sized to fit the largest triangular cross section defined by the end of the nail screw 50.

To prepare this embodiment for use the tool head 60 is coupled to the power tool, such as by insertion of the male coupling 62 into the chuck of a power drill, for example. In this embodiment the cylindrical body 61 may remain on the power tool, replacement of the insert 70 providing the necessary changes for different nail screw sizes. An appropriate insert 70 is selected in accordance with the size of the nail screw 50 to be driven, or the degree of countersink desired, and the insert then threaded into the end of the cylindrical body 61. Loading and driving of the screw nail proceeds in a manner similar to that hereinabove described using a unitary tool head rather than one with replaceable inserts.

It will be apparent that the illustrative embodiment of the present invention depicted in FIG. 9 may be adapted for use with the other nail screw and coupling embodiment illustrated in the drawings.

Although the present invention has been described with a certain degree of particularity, it is understood that the disclosure has been made only by way of example and that numerous changes in the details of construction may be resorted to without departing from the spirit and scope of the invention as hereinafter claimed.

What is claimed is:

1. A unitary nail screw fastener adapted to be driven by a rotary driving tool comprising an elongate cylindrical body having a pointed tip at one end thereof and a circumferentially projecting head at the other end thereof, said cylindrical body having threads thereon throughout the length extending from said pointed tip of approximately one-fourth to one-third of the total length of said body, said threads generally projecting radially outwardly beyond the circumference of the remaining said body and being adapted to engage surrounding material to cause longitudinal progression of said nail screw fastener upon rotation thereof by a rotary tool engaging said head, said head defining a predetermined plurality of circumferentially equally spaced radially outwardly extending flanges at said other end for receptive engagement with the head of a rotary driving tool.

2. A nail screw fastener as defined in claim 1, wherein said threads are rolled or stamped.

3. A nail screw fastener as defined in claim 1, wherein said flanges are three in number.

* * * * *